(12) United States Patent
Oh et al.

(10) Patent No.: US 7,686,871 B2
(45) Date of Patent: Mar. 30, 2010

(54) INTEGRATED FILTER ASSEMBLY

(75) Inventors: CheeFong Oh, Penang (MY); LiHong Zhang, Singapore (SG); Djohni Chandra, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 952 days.

(21) Appl. No.: 11/415,541

(22) Filed: May 2, 2006

(65) Prior Publication Data

US 2007/0256396 A1  Nov. 8, 2007

(51) Int. Cl.
  *B01D 53/02* (2006.01)
(52) U.S. Cl. .................... 96/134; 55/385.6; 55/491; 55/492; 360/97.02
(58) Field of Classification Search ............. 55/385.6, 55/491, 492; 360/97.02; 96/134
See application file for complete search history.

(56) References Cited

U.S. PATENT DOCUMENTS

| | | | | |
|---|---|---|---|---|
| 3,574,988 | A * | 4/1971 | Buckman ................. 55/418 |
| 4,370,687 | A * | 1/1983 | Shiraishi et al. .......... 360/78.04 |
| 5,030,260 | A * | 7/1991 | Beck et al. ............... 96/139 |
| 5,062,875 | A * | 11/1991 | Nagashima ............... 55/493 |
| 5,075,807 | A | 12/1991 | Inoue et al. .............. 360/97.02 |
| 5,293,286 | A | 3/1994 | Hasegawa et al. ........ 360/97.02 |
| 5,392,177 | A | 2/1995 | Chainer et al. ........... 360/97.02 |
| 5,590,001 | A * | 12/1996 | Ino et al. ................ 360/97.02 |
| 5,665,232 | A * | 9/1997 | Schlegel ................. 210/408 |
| 5,895,510 | A * | 4/1999 | Butler et al. ............. 55/490 |
| 5,936,178 | A | 8/1999 | Saari ..................... 84/453 |
| 6,077,335 | A | 6/2000 | Schneider et al. ........ 96/135 |
| 6,080,059 | A * | 6/2000 | Kim ...................... 454/155 |
| 6,110,533 | A | 8/2000 | Cote et al. .............. 427/341 |
| 6,179,903 | B1 * | 1/2001 | Muller ................... 96/55 |
| 6,244,432 | B1 | 6/2001 | Saari et al. ............. 206/213.1 |
| 6,296,691 | B1 | 10/2001 | Gidumal ................. 96/17 |
| 6,475,269 | B1 | 11/2002 | Turner .................. 96/134 |
| 6,475,270 | B1 | 11/2002 | Graeve .................. 96/135 |
| 6,491,741 | B2 | 12/2002 | Tuma et al. ............. 95/90 |
| 6,587,307 | B1 | 7/2003 | Raymond et al. ........ 360/137 |
| 6,654,201 | B2 | 11/2003 | Smith ................... 360/97.02 |
| 6,826,009 | B1 * | 11/2004 | Scura et al. ............ 360/97.03 |
| 7,486,474 | B2 * | 2/2009 | Shin et al. .............. 360/97.02 |
| 2002/0034040 | A1 | 3/2002 | Tomioka ................ 360/97.02 |
| 2003/0070551 | A1 * | 4/2003 | Fisk et al. ............. 96/134 |
| 2003/0151847 | A1 | 8/2003 | Tsang et al. ............ 360/97.02 |
| 2005/0024763 | A1 * | 2/2005 | Ng et al. ............... 360/97.02 |
| 2005/0185327 | A1 * | 8/2005 | Voights et al. .......... 360/97.03 |
| 2006/0285245 | A1 * | 12/2006 | Zhang et al. ........... 360/97.02 |

* cited by examiner

*Primary Examiner*—Robert J Hill, Jr.
*Assistant Examiner*—Christopher P Jones
(74) *Attorney, Agent, or Firm*—Alan G. Rego; Westman, Champlin & Kelly P.A.

(57) ABSTRACT

An integrated filter assembly is provided. The filter assembly includes a fastener that holds two substantially opposing elements of a housing together. Also included is a multi-purpose filter that has at least a particle filter component and a chemical filter component. The multi-purpose filter is attached to the fastener. The multi-purpose filter is within the housing when the fastener holds the two substantially opposing elements of the housing together.

19 Claims, 8 Drawing Sheets

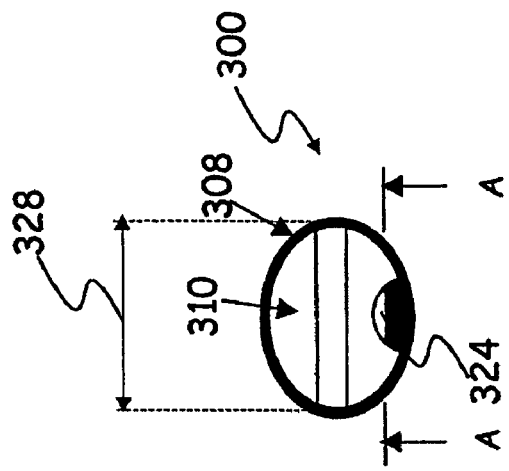
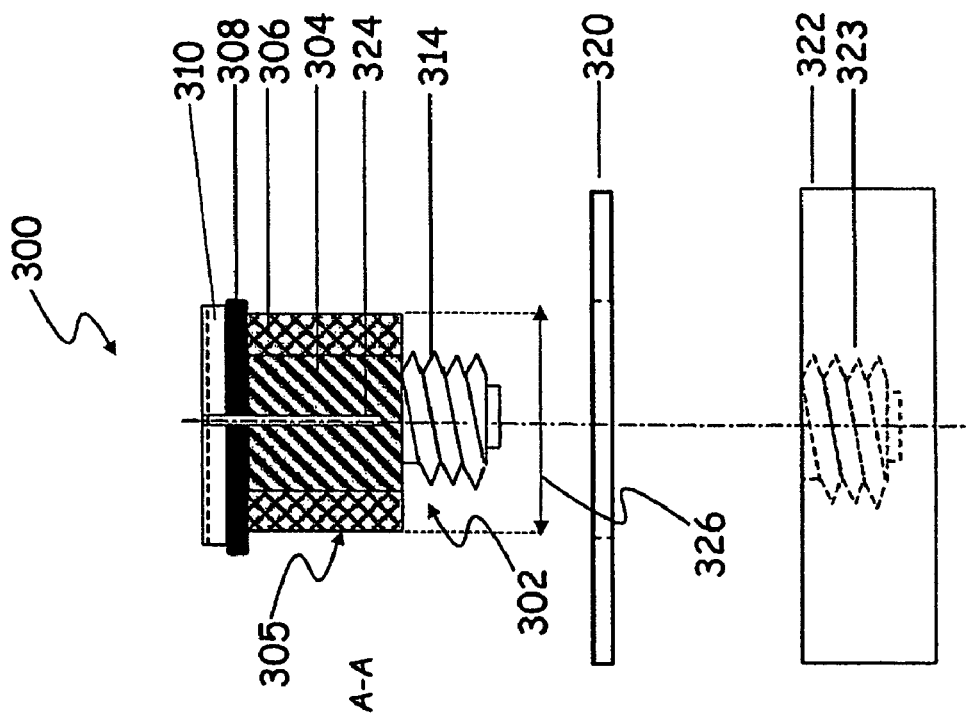

INTEGRATED FILTER ASSEMBLY

FIELD OF THE INVENTION

The present invention relates generally to the filtering of chemical and particle contaminants, and more particularly but not by limitation to an integrated filter assembly that can adsorb both chemical and particle contaminants.

BACKGROUND OF THE INVENTION

Heavy organic vapors (such as hydrocarbons, phthalates, adipates, fatty amines and phenols), corrosive inorganic gases (such as hydrogen chloride, hydrogen sulfide, sulfur dioxide, nitrogen oxides and ammonia) and particles comprise the major contaminants of disc drive data storage systems. Organic vapors and corrosive gases can induce smears on head and disc surfaces, corrode magnetic devices and other metallic components, while particles can either scratch or get embedded into various drive components, causing the drives to fail. Current disc drives are more susceptible to these contaminants because of the many material changes inside the drives required to respond to the need for higher recording density.

Most current disc drives use two separate filters; a particle filter packed with polymer fibers and a chemical filter including active-carbons. It is well known that a life span of a chemical filter including active-carbon is limited by its surface area for adsorption. With the continuing tendency to increase areal densities of disc drives and to reduce their size, having an independent particle filter and a separate relatively small chemical filter, with a relatively limited surface area for adsorption, may result in potential susceptibility to contaminants and insufficient space to hold them properly inside a drive. In general, decreasing the form factor of a drive necessitates reducing the footprints of components within the drive and therefore separate particle and chemical filters may not be suitable for use in drives with a reduced form factor.

Embodiments of the present invention provide solutions to these and other problems, and offer other advantages over the prior art.

SUMMARY OF THE INVENTION

An integrated filter assembly is provided. The filter assembly includes a fastener that holds two substantially opposing elements of a housing together. Also included is a multi-purpose filter that has at least a particle filter component and a chemical filter component. The multi-purpose filter is attached to the fastener. The multi-purpose filter is within the housing when the fastener holds the two substantially opposing elements of the housing together. The attachment of the multi-purpose filter around the fastener results in the chemical filter component having an increased volume or total surface area for adsorption.

Other features and benefits that characterize embodiments of the present invention will be apparent upon reading the following detailed description and review of the associated drawings.

BRIEF DESCRIPTION OF THE DRAWINGS

FIG. 3A is a plan view of one example embodiment of the integrated filter assembly.

FIG. 3B is a cross-sectional side view of the integrated filter assembly embodiment of FIG. 3A.

DETAILED DESCRIPTION OF ILLUSTRATIVE EMBODIMENTS

The present embodiments relate, in general, to an integrated filter assembly that can adsorb both chemical and particle contaminants. However, before describing embodiments of the integrated filter assembly in detail, one illustrative device in which the present embodiments can be used will be described.

Figure 1:
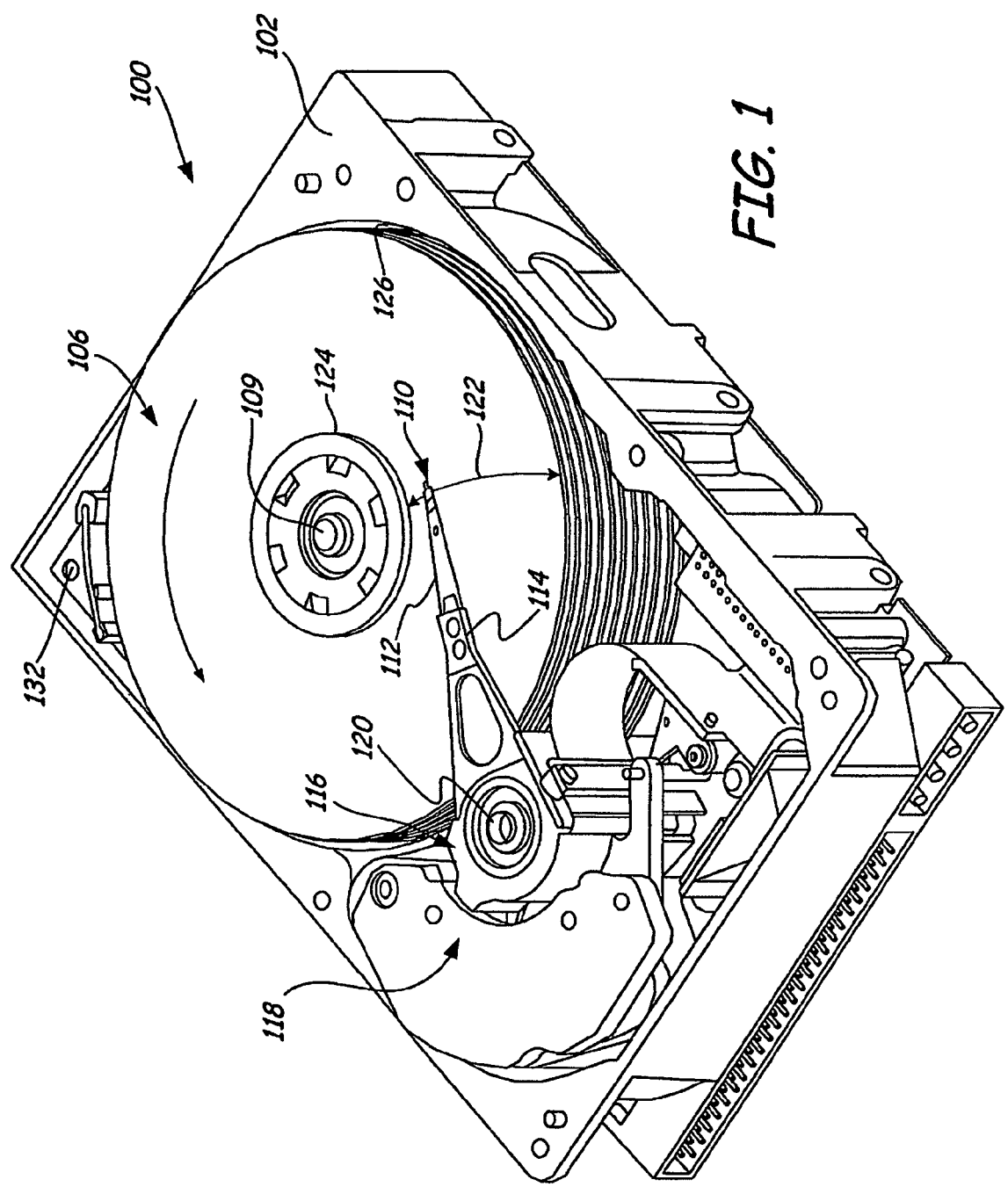
FIG. 1 is an isometric view of a disc drive.

FIG. 1 is an isometric view of a disc drive 100 in which embodiments of the present invention are useful. Disc drive 100 includes a housing with a base 102 and a top cover (not shown in FIG. 1). Disc drive 100 further includes a single disc or a disc pack 106 of multiple discs, which is mounted on a spindle motor (not shown) for co-rotation about central axis 109. It should be noted that a pack of multiple discs is utilized in some embodiments, and only a single disc 106 is used in other embodiments. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. As can be seen in FIG. 1, base plate 102 has a groove 132. An end of a fastener of an integrated filter assembly, described below in connection with FIGS. 2-7, fits into groove 132.

Figure 2:
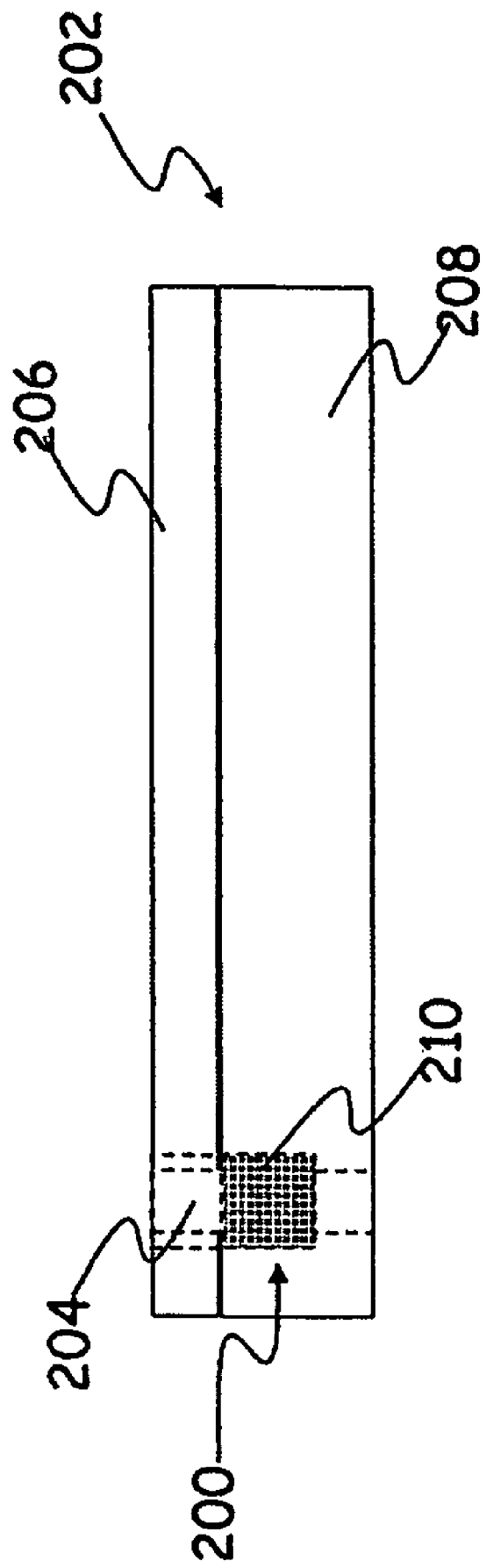
FIG. 2 is a simplified block diagram of an integrated filter assembly, installed in a housing, in accordance with one of the present embodiments.

FIG. 2 is a simplified block diagram of an integrated filter assembly 200, installed in a housing 202 (which may be a disc drive housing, for example), in accordance with one of the present embodiments. Filter assembly 200 includes a fastener 204 that holds two substantially opposing elements (top cover 206 and base 208) housing 202. Also included in filter assembly 200, is a multi-purpose filter 210 that has at least a particle filter component (not shown in FIG. 2) and a chemical filter component (not shown in FIG. 2). Multi-purpose filter 210 is attached to fastener 204. Multi-purpose filter 210 is within housing 202 when fastener 204 holds the two substantially opposing elements (206 and 208) of housing 202 together. In some embodiments, instead of filter 210 being a multi-purpose filter, it can be a single filter or single-purpose filter including only a chemical filer, only a particle filter, etc. Various components of an integrated filter assembly (such as 200) are described below in connection with FIGS. 3A, 3B and 3C.

Figure 3C:
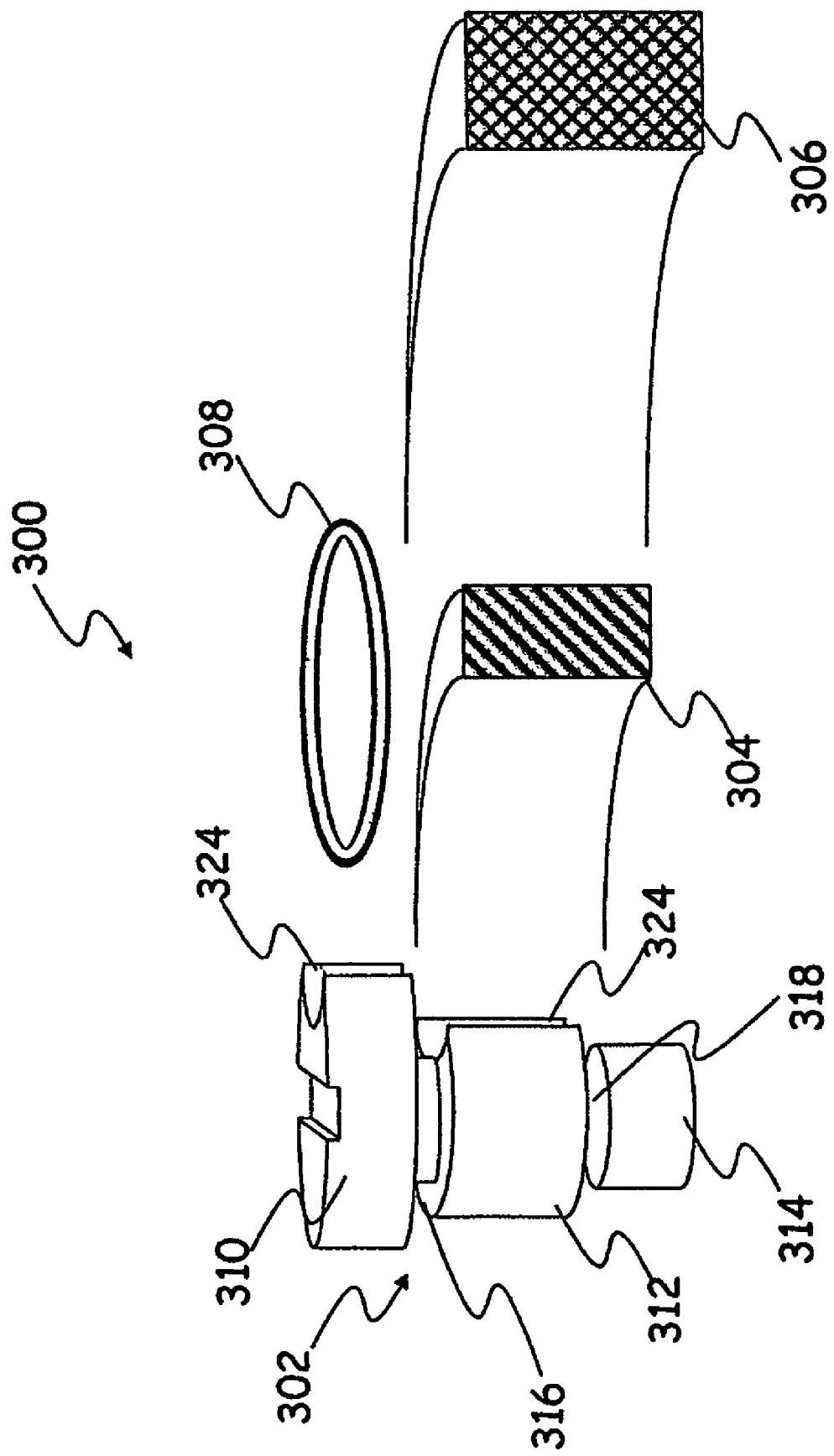
FIG. 3C is a three-dimensional cross-section view of the integrated filter assembly of FIGS. 3A and 3B.

FIG. 3A is a plan view of one example embodiment of an integrated filter assembly 300. FIG. 3B is a cross-sectional side view along section A-A of integrated filter assembly 300 and FIG. 3C is a three-dimensional cross-section view integrated filter assembly 300. As can be seen in FIGS. 3A, 3B and 3C, integrated filter assembly 300 includes, as its primary components, a fastener 302, a chemical filter 304, a particle filter 306 and an o-ring 308. Chemical filter 304 and particle filter 306 form multi-purpose filter 305. In some embodiments, particle filter 306 is a recirculation particle filter.

Fastener 302 connects, for example, a disc drive top cover 320 and base plate 322 (with screw threads 323, for example) and represents a housing for particle filter 306 and chemical filter 308. Fastener 302 includes a knob 310, a body 312 and a mechanical joining structure 314. Knob 310 is connected to a first end 316 of body 312 and mechanical joining structure 314 is connected to a second end 318 of body 312. Knob 310 is a screw or bolt knob, but may have one of different shapes such as round, circular, fillister, binding, etc. Knob 310 is useful for the installation and unfastening of integrated filter assembly 300. When integrated filter assembly 300 is installed, knob 310 and o-ring 308 serve as a shock protection structure for the disc drive.

Body 312 and knob 310 include a slot 324, which acts as a breather hole. O-ring 308 attached between knob 310 and body 312 to ensure proper sitting of integrated filter assembly 300 and also serves as a sealing device that additionally provides a cushioning effect. When integrated filter assembly 300 is installed, knob 310 and o-ring 308 serve as a shock protection structure. Multi-purpose filter 305 is attached to body 312 of fastener 302.

Mechanical joining structure 314 is a locking mechanism that helps ensure that integrated filter assembly 300 "sits" properly in a disk drive assembly, for example. Joining structure 314 can be any suitable type of plug, threaded screw or any other similar structure.

As can be seen in FIGS. 3B and 3C, integrated filter assembly 300 also includes a breather hole 324. It should be noted that disc drives are not sealed, because they have to be able to pass air between the inside of the drive and the outside, in order to equalize any air pressure differential that may exist between the two environments. This allows the disc drive to maintain proper equilibrium when the weather changes, or the drive is moved to a different altitude; if pressure is not balanced, the drive might not perform properly and damage could even result. Breather hole 324 is included for this purpose. In FIGS. 3B and 3C, chemical filter 304 is attached next to breather hole 324. Chemical filter 304 can comprise active carbon, carbon fiber, silica gel etc. Filter 304 adsorbs gas-phase chemicals and other drive contaminants. It also prevents inflow of "dirty" air from an environment outside the disc drive and releases chemical vapors from the disc drive when there are pressure changes.

Particle filter 306, which is attached to chemical filter 304, is used for capturing airborne particles within the disc drive. In general, these particles may be generated when moving parts of the disc drive rub against each other during drive operation. A principal source of dust within the drive is microparticles that flake off of the parking surfaces when the drive is started and stopped. Particle filter 306, which helps capture the dust particles, can comprise polymer fiber, cotton fiber, active carbon fiber, etc.

As noted above, chemical filter 304 and particle filter 306 form multi-purpose filter 305. Chemical filter 304 and particle filter 306 are each hollow cylinders that form a single hollow cylinder, which is multi-purpose purpose filter 305. In order to facilitate easy installation and removal of integrated filter assembly 300, an outer diameter 326 of hollow cylinder 305 is less than or equal to a diameter 328 of knob 310. The relative ease of installation and removal of integrated filter assembly 300 makes it replaceable.

Figure 4:
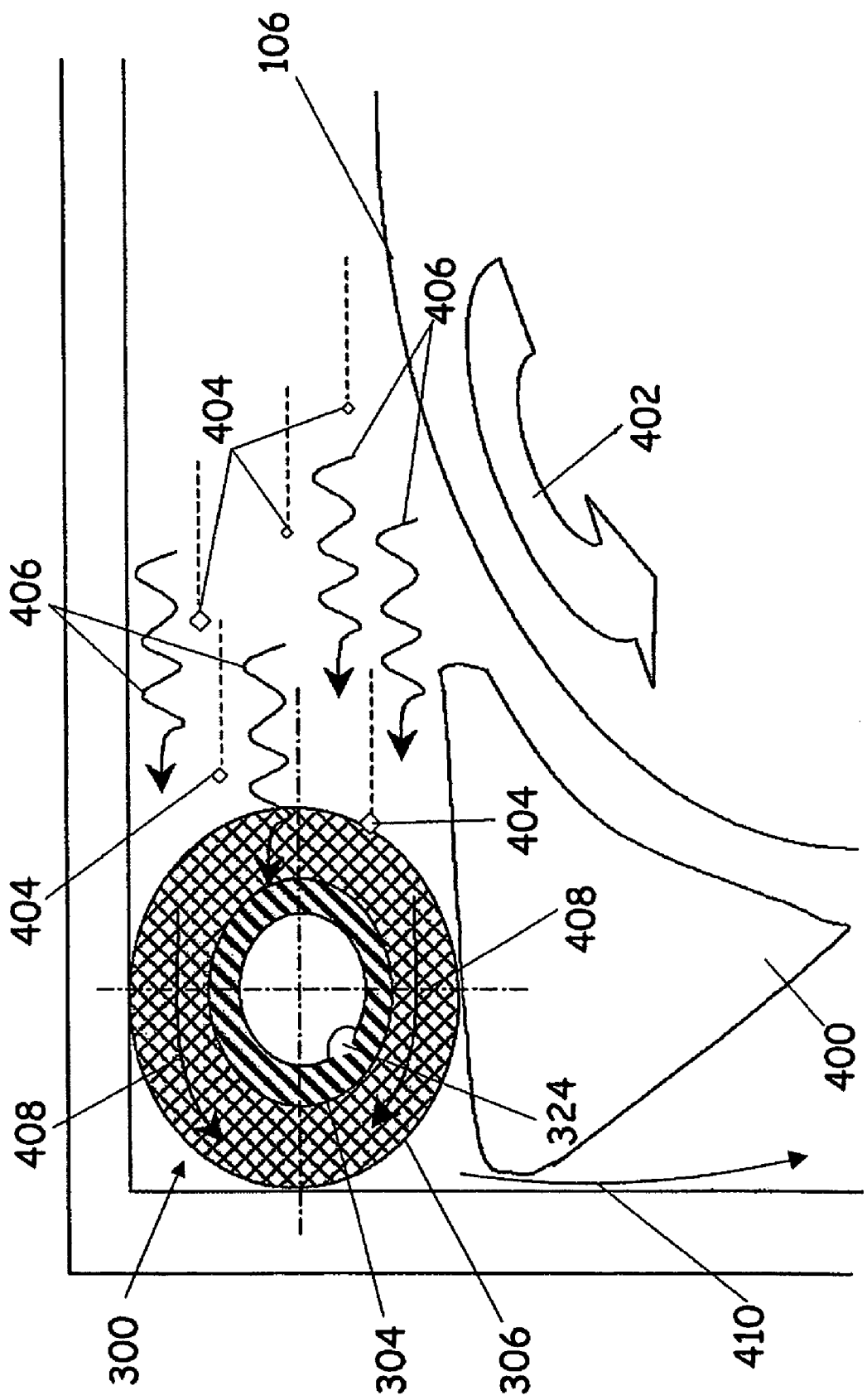
FIG. 4 is a cross-sectional plan view illustrating a functioning mechanism of one example embodiment of the integrated filter assembly.

FIG. 4 is a cross-sectional plan view illustrating a functioning mechanism of integrated filter assembly 300. Integrated filter assembly 300 is preferably placed at an air flow channeling location. In FIG. 4, component 400 is a feature that helps direct air flow in the disc drive. During operation, disc 106 spins in a direction shown by arrow 402. Air within the drive is pushed toward the filter first layer (particle filter, 306) where airborne particles (represented by reference numerals 404) are trapped. Reference numerals 408 indicate the presence of a long diffusion path for trapping fine particles. Thereafter, the remaining air that includes outgassed chemical vapors (represented by reference numerals 406) is adsorbed by the second layer (chemical filter, 304). The substantially "clean" air after the two-layer filtration either recirculates in the disc drive or is exchanged with the exterior environment through breather hole 324. The recirculation or flow of air in the disc drive takes place in a direction of rotation of the disc 106 (which is typically counterclockwise). In FIG. 4, arrow 410 shows a recirculation direction of air after the two-layer filtration.

Figure 5:
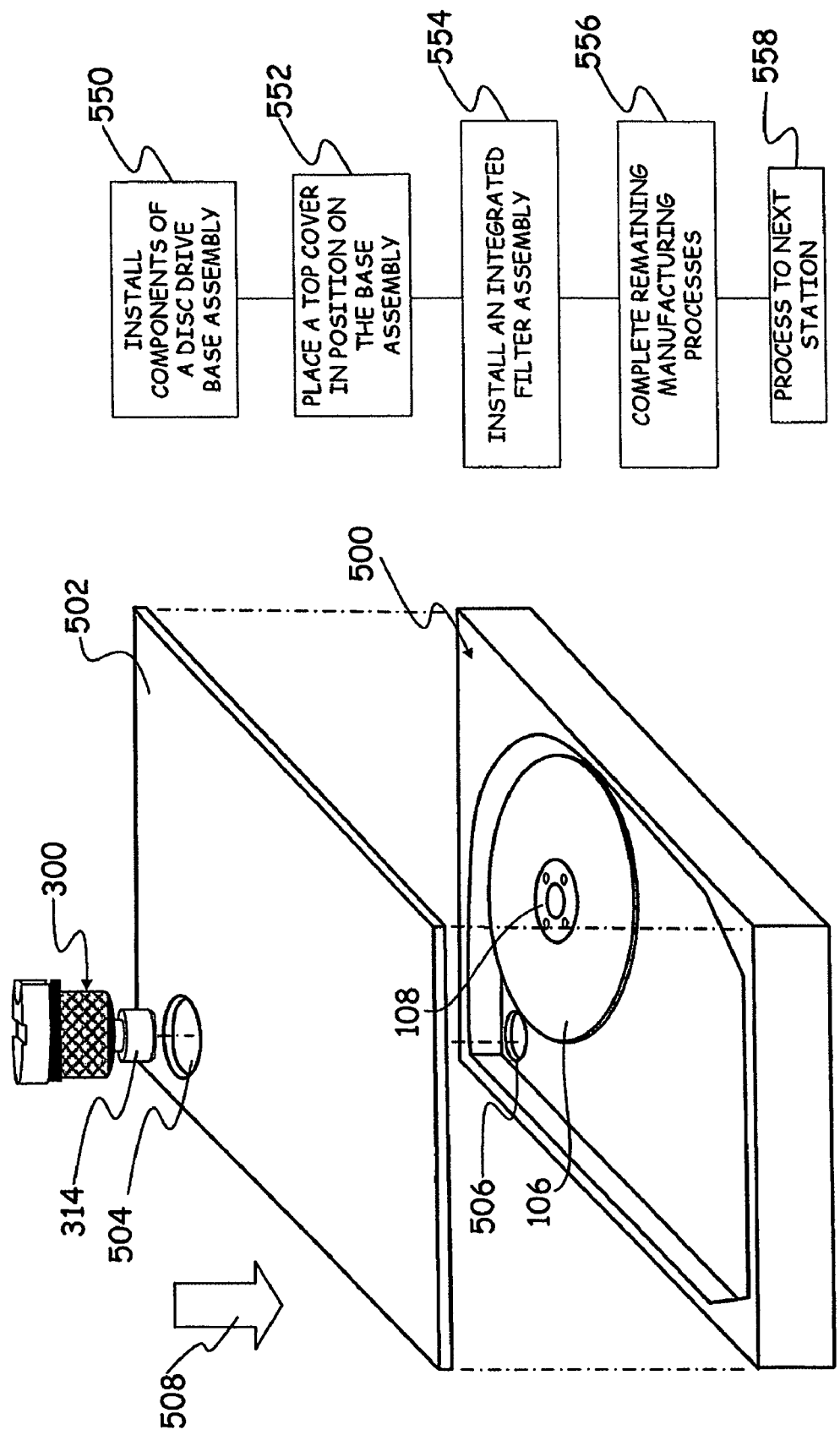
FIG. 5 is a block diagram and flow diagram illustrating a disc drive installation sequence, which includes the installation of the integrated filter assembly.

FIG. 5 is a block diagram and flow diagram illustrating a disc drive installation sequence, which includes the installation of the integrated filter assembly. As can be seen in FIG. 5, components (such as discs 106, clamp 108, etc.) that form disc drive base assembly 500 are first installed (step 550). A next step 552, involves placing top cover 502 in position on base assembly 500 such that first groove 504 and second groove 506 are substantially aligned. At step 554, integrated filter assembly 300 is introduced into the housing through first groove 504 and mechanical joining structure 314 is inserted into second groove of base assembly 500. Knob 310 is then tightened. A direction of installation is shown by arrow 508. At step 556, any remaining manufacturing processes are carried out. For example, if discs 106 are not prewritten discs (discs with servo tracks written prior to installation in base assembly 500), then a servo track writing process is carried out at step 556. At step 558, the assembled disc drive is moved to a next station.

Since the integrated filter assembly is installed after the other mechanical components of the disc drive are installed, it can relatively easily be removed and replaced. In some of the present embodiments, the integrated filter assembly can be removed, and only the multi-purpose filter portion, for example, may be replaced if desired. The original fastener with the new multi-purpose filter can then be reinstalled in the drive. In general, either a part, or all, of the integrated filter assembly can be replaced. Experimental results obtained in connection with disc drives employing integrated filter assemblies (such as 300) are discussed below in connection with FIGS. 6 and 7.

Figure 6:
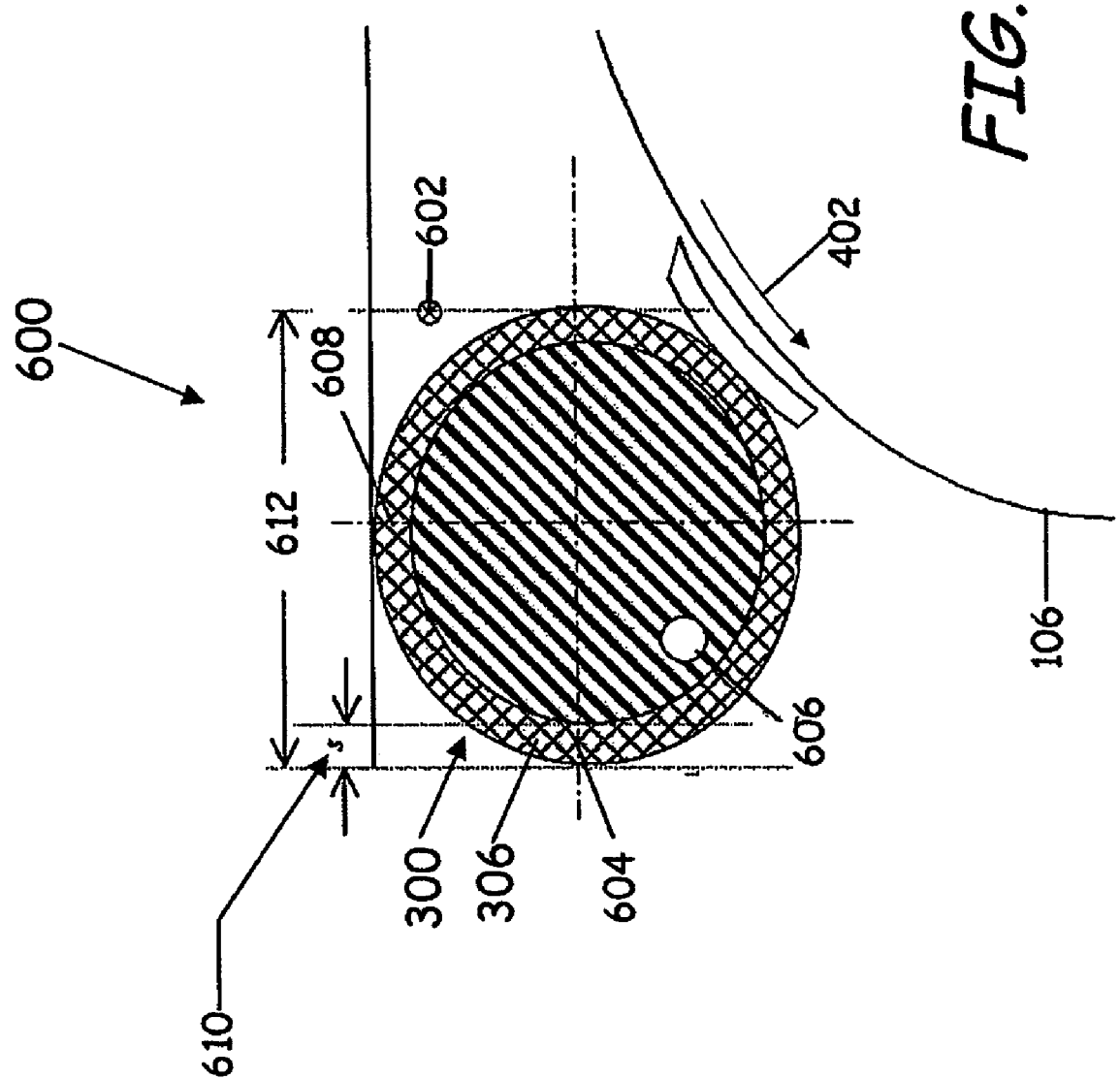
FIG. 6 is a diagrammatic illustration of a simulated disc drive model including the integrated filter assembly.

FIG. 6 is a diagrammatic illustration of a simulated disc drive model 600 that includes integrated filter assembly 300. In FIG. 6, reference numerals 602, 604, 606 and 608 represent points A, B, C and D, respectively. As can be seen in FIG. 6, point A (602) is outside, but proximate, integrated filter assembly 300, point B (604) is a first point within particle filter 306, point C (606) is breather hole 324 and point D (608) is a second point within particle filter 306. Particle filter width 's' is represented by reference numeral 610 and an outer diameter of particle filter 306 is represented by reference numeral 612. Disc 106 rotates in direction 402.

Using simulated disc drive model 600 with integrated filter assembly 300 shown in FIG. 6, the following parameters are measured at points A (602), B (604), C (606) and D (608) with the help of a manometer during disc drive operation:

$\Delta P_A$: Pressure build-up of air before entering the integrated filter assembly.

$-\Delta P_C$: Pressure drop at the breather hole of the integrated filter assembly.

$\Delta P_D$: Pressure build-up of air upon entry into the particle filter.

$V_B$: Velocity of air passing through a middle of the particle filter of the integrated filter assembly.

$-\Delta P_A$, $\Delta P_B$, $\Delta P_D$, and $V_R$ are compared with drops in air pressure in other locations in the drive, where air pressure is more stable, and with air pressure values at a breather hole, and air velocity of a recirculation filter, of a similar drive model that uses presently available separate chemical and particle filters.

It should be noted that breather holes should be in either a negative or neutral pressure location to prevent sucking of external air from other parts of a drive where that are not protected by filters. Further, air passing through the recirculation filter should have a velocity that enables the trapping of particles through high impact force (for large particles) and high diffusion into the filter (for small particles).

Table 1 below includes pressure and velocity measurement data obtained for different widths of particle filter 's' shown in FIG. 6.

TABLE 1

| S (approximate) | $\Delta P_A$ (Torr) Positive pressure | $-\Delta P_C$ (Torr) Negative pressure | $\Delta P_D$ (Torr) Positive pressure | $V_B$ (m/sec, 70° F.) Negative pressure |
|---|---|---|---|---|
| 1 mm | 0.30~0.32 | 0.14~0.18 | 0.36-0.45 | ~1.5 |
| 2.5 mm | 0.09~0.11 | 0.14~0.16 | 0.20-0.30 | ~1.1 |

In a similar drive model that uses presently available separate chemical and particle filters and has a breather hole in a drive base plate, pressure build-up ($P_{build-up}$)=0.28 Torr and pressure drop $P_{drop}$=0.082 Torr. It should be noted that these pressure values are dependent upon locations of the chemical filter, particle filter and the breather hole.

Based on the information in Table 1, it is clear that point A and point D are positive pressure locations, while point B and point C are negative pressure locations. Further, from the results included in Table 1 and pressure measurement data from similar drives using separate chemical and particle filters, the following can be concluded:

A breather hole is in a negative pressure location and has low air resistance. The low air resistance helps attract air within the disc drive to this location and lets it escape out of the breather hole, thereby helping prevent leakage of air from other higher air resistance locations in the drive.

A particle filter in an integrated filter assembly provides longer pass length for air than a separate particle filter in a similar disc drive model and has a relatively highly efficiency for trapping particles.

A relatively high air-velocity is maintained inside the particle filter. This is helpful in increasing a diffusion length of particles inside the particle filter.

A chemical filter in an integrated filter assembly is in a high pressure (high air-density) location, thereby benefiting adsorption.

A single block, with concentrically arranged filters, occupies less space than separately positioned chemical and particle filters.

Figure 7:
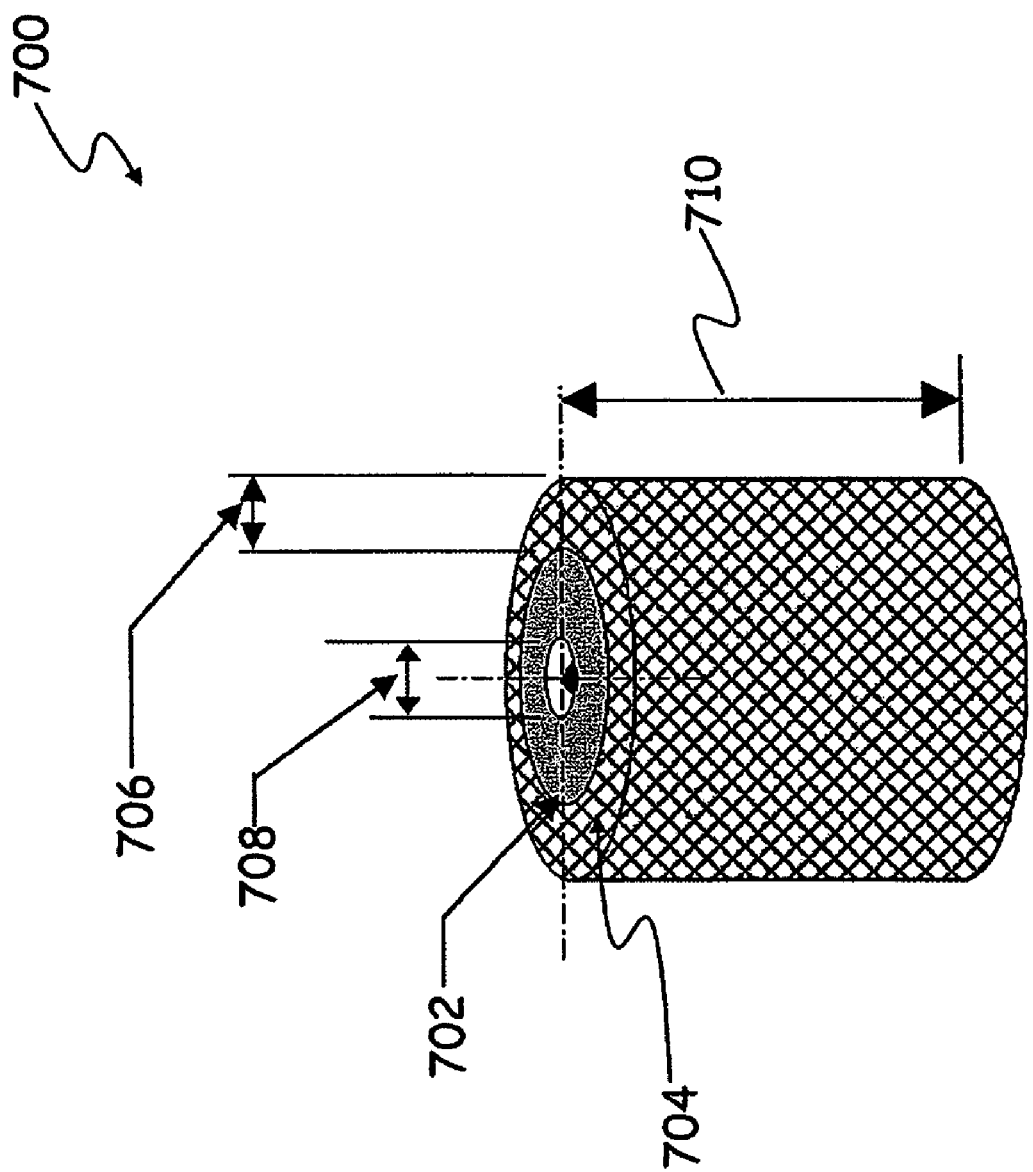
FIG. 7 is a diagrammatic illustration of a multi-purpose filter of the integrated filter assembly.

FIG. 7 is a diagrammatic illustration of a multi-purpose filter 700 (including a chemical filter 702 and a particle filter 704) of an integrated filter assembly. In FIG. 7, reference numeral 706 represents a particle filter thickness, reference numeral 708 represents a multi-purpose filter inner diameter (or plug diameter) and reference numeral 708 represents a filter height. Data in Table 2 below are calculated based on an embodiment of the integrated filter assembly and compared with data obtained from current drives of different form factor.

TABLE 2

| Drive form factor | Carbon adsorber amount for integrated filter assembly | Carbon amount in current drive | Thickness of particle filter in integrated filter assembly | Plug diameter |
|---|---|---|---|---|
| 1" | 19 mg | 16-17 mg | 0.5 mm | 1 mm |
| 2.5" | 86 mg | 9.6-20 mg | 1 mm | 2 mm |
| 3.5" | 588 mg | 98-120 mg | 2 mm | 2 mm |

From the data in Table 2, it is clear that the integrated filter assembly can hold a greater amount of carbon than what is currently needed. Therefore, there is substantial flexibility for adjusting relative amounts of carbon filter and particle filter material in embodiments of the integrated filter assembly.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the integrated filter assembly while maintaining substantially the same functionality without departing from the scope and spirit of the present invention. In addition, although the preferred embodiment described herein is directed to an integrated filter assembly for a disc drive data storage system, it will be appreciated by those skilled in the art that the teachings of the present invention can be applied to other systems that require filters, without departing from the scope and spirit of the present invention.

What is claimed is:

1. An integrated filter assembly comprising:
   a fastener configured to hold two substantially opposing elements of a housing together; and
   a multi-purpose filter, having at least a particle filter component and a chemical filter component, connected to the fastener, such that the multi-purpose filter is within the housing when the fastener holds the two substantially opposing elements of the housing together, and
   wherein the fastener comprises a channel that serves as a breather hole for the filter assembly when the fastener and the multi-purpose filter are connected and within the housing, the breather hole enables an air exchange through the filter between an environment within the housing and an environment outside the housing.

2. The integrated filter assembly of claim 1 wherein the multi-purpose filter is a hollow cylinder which fits around a body of the fastener.

3. The integrated filter assembly of claim 2 wherein the hollow cylinder comprises an inner hollow cylindrical component and an outer hollow cylindrical component.

4. The integrated filter assembly of claim 3 wherein the inner hollow cylindrical component is the chemical filter component and the outer hollow cylindrical component is a particle filter component.

5. The integrated filter assembly of claim 1 wherein the fastener comprises a knob, a body and a mechanical joining structure, with the knob connected to a first end of the body and the mechanical joining structure connected to a second end of the body.

6. The integrated filter assembly of claim 5 wherein the multi-purpose filter is a hollow cylinder which fits around the body of the fastener, and wherein an outer diameter of the hollow cylinder is less than or equal to a diameter of the knob.

7. The integrated filter assembly of claim 5 wherein the channel that serves as the breather hole comprises a slot in the knob and the body of the fastener.

8. The integrated filter assembly of claim 5 and further comprising an o-ring configured for attachment between the knob and the body.

9. The integrated filter assembly of claim 5 wherein a shape of the knob is one of a round shape, a circular shape, a fillister shape or a binding shape.

10. The integrated filter assembly of claim 5 wherein the mechanical joining structure is one of a threaded screw or a press fit component.

11. A disc drive comprising the integrated filter assembly of claim 1.

12. The integrated filter assembly of claim 1 wherein the channel that serves as the breather hole comprises a recess extending inwardly from an outer surface of the fastener.

13. The integrated filter assembly of claim 12 where the outer surface of the fastener from which the recess extends inwardly is an outer cylindrical surface of the fastener.

14. An apparatus comprising: a housing; and a replaceable integrated filter assembly having a fastener that is adapted to hold two substantially opposing elements of the housing together, and wherein the replaceable integrated filter assembly comprises a channel that serves as a breather hole when the integrated filter assembly is within the housing, the breather hole enables an air exchange through the integrated filter assembly between an environment within the housing and an environment outside the housing, and wherein the replaceable integrated filter assembly further comprises a multi-purpose filter, having at least a particle filter component and a chemical filter component, connected to the fastener, such that the multi-purpose filter is within the housing when the fastener holds the two substantially opposing elements of the housing together.

15. The apparatus of claim 14 and further comprising at least one rotatable data storage disc within the housing.

16. The apparatus of claim 14 wherein the elements of the housing that the replaceable integrated filter assembly is adapted to hold together comprise a top cover and a base.

17. The integrated filter assembly of claim 16 wherein the multi-purpose filter is a hollow cylinder which fits around a body of the fastener.

18. The integrated filter assembly of claim 17 wherein the hollow cylinder comprises an inner hollow cylindrical component and an outer hollow cylindrical component.

19. The apparatus of claim 16 wherein the channel that serves as the breather hole comprises a recess extending inwardly from an outer surface of the fastener.

* * * * *

UNITED STATES PATENT AND TRADEMARK OFFICE
CERTIFICATE OF CORRECTION

| | | |
|---|---|---|
| PATENT NO. | : 7,686,871 B2 | Page 1 of 1 |
| APPLICATION NO. | : 11/415541 | |
| DATED | : March 30, 2010 | |
| INVENTOR(S) | : CheeFong Oh et al. | |

It is certified that error appears in the above-identified patent and that said Letters Patent is hereby corrected as shown below:

Title page, item (75) delete "Penang (MY)" and insert --Singapore (SG)--.

Signed and Sealed this
Twenty-second Day of February, 2011

David J. Kappos
*Director of the United States Patent and Trademark Office*